United States Patent
Kim et al.

(10) Patent No.: US 10,347,242 B2
(45) Date of Patent: Jul. 9, 2019

(54) METHOD, APPARATUS, AND COMPUTER-READABLE RECORDING MEDIUM FOR IMPROVING AT LEAST ONE SEMANTIC UNIT SET BY USING PHONETIC SOUND

(71) Applicant: NAVER CORPORATION, Seongnam-si (KR)

(72) Inventors: Min Chul Kim, Seoul (KR); Hyun Geun Jo, Seoul (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 14/859,433

(22) Filed: Sep. 21, 2015

(65) Prior Publication Data
US 2016/0253993 A1     Sep. 1, 2016

(30) Foreign Application Priority Data
Feb. 26, 2015   (KR) .................. 10-2015-0026982

(51) Int. Cl.
*G10L 15/00*     (2013.01)
*G10L 15/18*     (2013.01)
(Continued)

(52) U.S. Cl.
CPC ........ *G10L 15/1815* (2013.01); *G10L 15/065* (2013.01); *G10L 15/187* (2013.01); *G10L 2015/025* (2013.01)

(58) Field of Classification Search
CPC ...................................... G10L 15/00
(Continued)

(56) References Cited

U.S. PATENT DOCUMENTS 8,103,502 B1 * 1/2012 Bangalore .......... G06K 9/00355
                                                         704/243
8,606,577 B1 * 12/2013 Stewart .................. G06F 3/167
                                                         704/231
(Continued)

FOREIGN PATENT DOCUMENTS

JP      2000105597 A     4/2000
KR    1020120110751 A   10/2012
(Continued)

OTHER PUBLICATIONS

Kim, Min Chul, U.S. Appl. No. 14/779,037, filed Sep. 22, 2015.

*Primary Examiner* — Michael C Colucci
(74) *Attorney, Agent, or Firm* — Greer, Burns & Crain, Ltd.

(57) ABSTRACT

The present invention relates to a method, an apparatus, and a computer-readable recording medium for improving at least one semantic unit set by using a phonetic sound. The method for improving a set including at least one semantic unit, in which the set including at least one semantic unit is a captured semantic unit set, includes: receiving an improvement phonetic sound according to utterance of a user; specifying an improvement semantic unit set on the basis of the improvement phonetic sound; specifying a semantic unit set as a target to be actually improved within the captured semantic unit set, as a matched semantic unit set, on the basis of correlation thereof with the improvement semantic unit set; and replacing the matched semantic unit set within the captured semantic unit set with the improvement semantic unit set.

6 Claims, 4 Drawing Sheets

(51) Int. Cl.
*G10L 15/187* (2013.01)
*G10L 15/065* (2013.01)
*G10L 15/02* (2006.01)

(58) Field of Classification Search
USPC ..... 704/235, 9, 275, 260, 249; 715/816, 257
See application file for complete search history.

(56) References Cited

U.S. PATENT DOCUMENTS

| | | | | |
|---|---|---|---|---|
| 8,645,825 | B1 * | 2/2014 | Cornea | G06F 17/276 |
| | | | | 715/257 |
| 8,954,329 | B2 * | 2/2015 | Labsky | G10L 13/08 |
| | | | | 704/260 |
| 9,292,621 | B1 * | 3/2016 | Roth | G06F 16/90324 |
| 9,318,108 | B2 * | 4/2016 | Gruber | G10L 15/22 |
| 9,489,372 | B2 * | 11/2016 | Prilepov | G06F 17/273 |
| 9,715,489 | B2 * | 7/2017 | Pasquero | G06F 17/273 |
| 9,922,642 | B2 * | 3/2018 | Pitschel | G10L 15/063 |
| 10,134,385 | B2 * | 11/2018 | Naik | G10L 13/086 |
| 2005/0071170 | A1 * | 3/2005 | Comerford | G10L 15/04 |
| | | | | 704/275 |
| 2006/0004570 | A1 * | 1/2006 | Ju | G10L 15/22 |
| | | | | 704/243 |
| 2006/0057545 | A1 | 3/2006 | Mozer et al. | |
| 2008/0059152 | A1 * | 3/2008 | Fridman | G06F 17/2735 |
| | | | | 704/9 |
| 2008/0120102 | A1 * | 5/2008 | Rao | G10L 15/22 |
| | | | | 704/235 |
| 2011/0060587 | A1 * | 3/2011 | Phillips | G10L 15/30 |
| | | | | 704/235 |
| 2011/0202876 | A1 * | 8/2011 | Badger | G06F 3/0237 |
| | | | | 715/816 |
| 2015/0149163 | A1 * | 5/2015 | VanBlon | G10L 15/08 |
| | | | | 704/231 |

FOREIGN PATENT DOCUMENTS

KR 1020130008663 A 1/2013
KR 101381101 B1 3/2014

\* cited by examiner

METHOD, APPARATUS, AND COMPUTER-READABLE RECORDING MEDIUM FOR IMPROVING AT LEAST ONE SEMANTIC UNIT SET BY USING PHONETIC SOUND

CROSS-REFERENCE TO RELATED APPLICATION

This application claims priority to and the benefit of Korean Patent Application No. 10-2015-0026982 filed in the Korean Intellectual Property Office on Feb. 26, 2015, the entire contents of which are incorporated herein by reference.

BACKGROUND OF THE INVENTION (a) Field of the Invention

The present invention relates to a method, an apparatus, and a computer-readable recording medium for improving at least one semantic unit set (hereinafter simply referred to as "semantic unit") by using a phonetic sound.

CROSS-REFERENCE TO RELATED APPLICATION

This application claims the benefit of Korean Application No. 10-2014-0048315 and Korean Application No. 10-2014-0077056, the disclosures of which are incorporated herein in their entirety by reference.

(b) Description of the Related Art

There have been attempted to recognize a human being's voice and convert the recognized voice into a standard set of semantic units (i.e., a set including at least one semantic unit). Such a semantic unit set may be output as a digital phonetic sound corresponding to a specific language or written in text of a specific language.

However, the semantic unit set obtained according to the forgoing attempt has a limitation to a degree in terms of quality. For example, numerous locution habits of people, indistinct pronunciations of some people, the use of lexicons or regional dialect not present in dictionaries, surrounding environments including noise, and the like, substantially make it difficult to derive a semantic unit set according to voice recognition techniques.

Thus, the inventor of the present application proposes a new technique for obtaining a semantic unit set having excellent quality by improving at least one semantic unit set by using an improvement phonetic sound (that is, a phonetic sound separately uttered for improvement). Here, a semantic unit set as a target or improvement may not necessarily be limited to one obtained by a voice recognition technology.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve all the problems of the related art.

The present invention has also been made in an effort to improve at least one semantic unit set by using a phonetic sound.

The present invention has also been made in an effort to easily and accurately improve a result of voice recognition.

The present invention has also been made in an effort to easily and accurately improve a result of text input.

A set including at least one semantic unit may be improved by an improvement phonetic sound according to the present invention described hereinafter, regardless of whether the set is a digital phonetic sound or text as an outcome obtained by recognizing a human being's analog voice through a predetermined electronic device (not shown) or regardless of whether the set is a digital phonetic sound input through an electronic device (not shown) (for example, input by a keyboard or a keypad) and subsequently output based on a text to speech (TTS) technique or regardless of whether the set is text input and subsequently displayed on a screen. In an aspect of improvement, correction of a voice recognition result or correction of a typo in displayed text after being input may be performed. In this point of view, a representative configuration of the present invention is as follows.

An exemplary embodiment of the present invention provides a method for improving a set including at least one semantic unit, in which the set including at least one semantic unit is a captured semantic unit set, including: receiving an improvement phonetic sound according to utterance of a user; specifying an improvement semantic unit set on the basis of the improvement phonetic sound; specifying a semantic unit set as a target to be actually improved within the captured semantic unit set, as a matched semantic unit set, on the basis of correlation thereof with the improvement semantic unit set; and replacing the matched semantic unit set within the captured semantic unit set with the improvement semantic unit set.

Another exemplary embodiment of the present invention provides a computer-readable recording medium storing a computer program for executing another method, another apparatus, and the foregoing method.

According to an embodiment of the present invention, a set of at least one semantic unit may be improved by using a phonetic sound.

According to an embodiment of the present invention, a result of voice recognition may be easily and accurately improved.

According to an embodiment of the present invention, a result of text input may be easily and accurately improved.

DETAILED DESCRIPTION OF THE EMBODIMENTS

Figure 1:
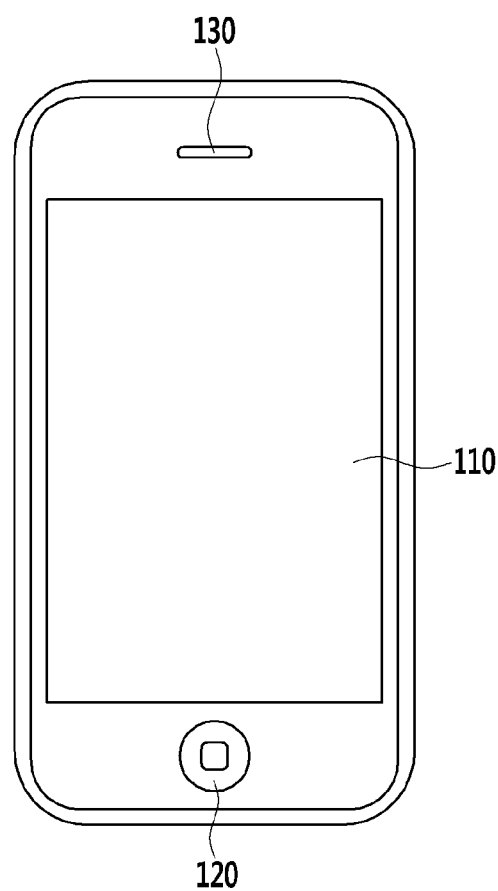
FIG. 1 is a view schematically illustrating an appearance of a semantic unit improving device according to an exemplary embodiment of the present invention.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, embodiments will be described in detail with reference to the accompanying drawings such that they can be easily practiced by those skilled in the art to which the present invention pertains.

[Exemplary Embodiment of Present Invention]

Configuration of Device

FIG. 1 is a view schematically illustrating an appearance of a semantic unit improving device according to an exemplary embodiment of the present invention.

As illustrated in FIG. 1, the semantic unit improving device 100 includes a display unit 110 (for example, a display panel) displaying visual information regarding various semantic unit sets, or the like, for a user, a button unit 120 (for example, a home button of a smartphone) performing a predetermined function when the user presses or touches the button unit 120 according to types of the semantic unit improving device 100, a sound output unit 130 (for example, a speaker) outputting a voice or a sound generated in the semantic unit improving device 100, an acoustic sensor (typically, a microphone disposed below the button unit 120) (not shown), and any known electric/electronic components (not shown). In FIG. 1, the semantic unit improving device 100 is illustrated as a smartphone, but the semantic unit improving device 100 is not limited thereto and any digital device may be employed as the semantic unit improving device 100 as long as it includes a memory unit and a microprocessor supporting computation capability, such as a desktop computer, a notebook computer, a work station, a personal digital assistant (PDA), a Web pad, a mobile phone (excluding a smartphone), various smart wearable devices (e.g., a smart watch, a smart band, smart glasses, or a smart ring).

Figure 2:
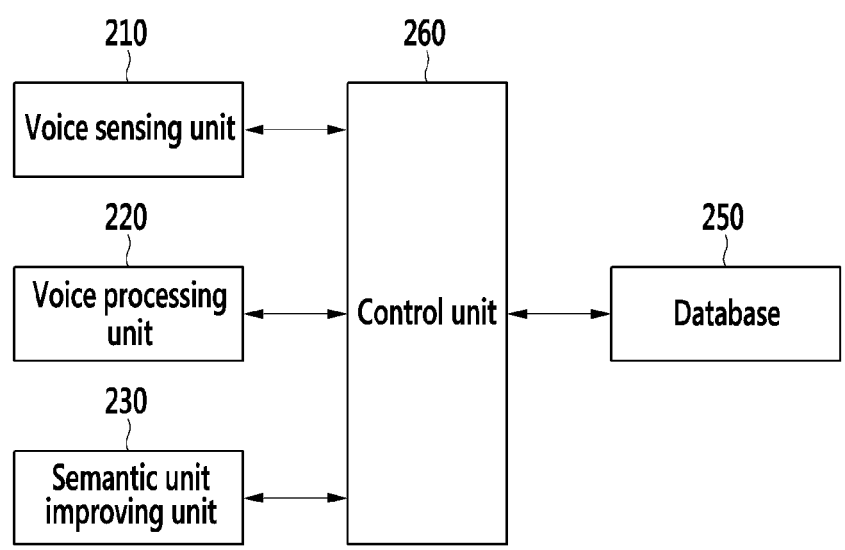
FIG. 2 is a block diagram conceptually illustrating an internal configuration of the semantic unit improving device according to an exemplary embodiment of the present invention.

Hereinafter, an internal configuration of the semantic unit improving device 100 will be described in detail with reference to FIG. 2. FIG. 2 is a block diagram conceptually illustrating an internal configuration of the semantic unit improving device according to an exemplary embodiment of the present invention.

As illustrated in FIG. 2, the semantic unit improving device 100 according to an exemplary embodiment of the present invention may include a voice sensing unit 210, a voice processing unit 220, a semantic unit improving unit 230, a database 250, and a control unit 260. According to an exemplary embodiment of the present invention, at least a portion of the voice sensing unit 210, the voice processing unit 220, the semantic unit improving unit 230, the database 250, and the control unit 260 may be a program module for controlling other hardware components or software components, or communicating with such components. The program module maybe included as an operating system, an application program module, or other program module in the semantic unit improving device 100, and may be physically stored in various known storage devices. Also, such a program module may be stored in a remote storage device (not shown) or even in an external electronic device (not shown) able to communicate with the semantic unit improving device 100. Thus, at least a portion of functions of the semantic unit improving device 100 may be executed by an external electronic device, or the like, according to free choice by a person skilled in the art. The program modules may be stored on remote memory devices communicable to the terminal 200. The program modules may include, but not be subject to, a routine, a subroutine, a program, an object, a component, and a data structure for executing a specific operation or a type of specific abstract data that will be described in accordance with the present invention.

First, the voice sensing unit 210 according to an exemplary embodiment of the present invention may execute a function to sense a voice uttered by a user, that is, an analog voice corresponding to a greater semantic unit set including at least one semantic unit set to be improved, or an improvement phonetic sound that may be uttered separately by a user for such an improvement described above.

To this end, the voice sensing unit 210 may include the aforementioned acoustic sensor as part thereof or may at least communicate with the acoustic sensor. The acoustic sensor may include, for example, a noise sensor able to sense even a voice signal having a small amplitude, a vibration sensor, and an ultrasonic sensor, as well as a general acoustic sensor such as a microphone. Instead of a general microphone, a hydrophone, a condenser microphone, an electret condenser microphone, a dynamic microphone, a ribbon microphone, a carbon microphone, a piezoelectric microphone, an optical fiber microphone, a laser microphone, a liquid microphone, or a MEMS microphone may also be employed.

The acoustic sensor may be disposed in at least a portion of the voice sensing unit 210, a chassis, a main board (not shown), a printed circuit board (PCB) (not shown), and an enclosure (not shown) of the semantic unit improving device 100.

The voice sensing unit 210 may transfer an analog signal of the sensed voice to the voice processing unit 220 as described hereinafter.

The voice processing unit 220 according to an exemplary embodiment of the present invention may serve to convert the analog voice signal transferred from the voice sensing unit 210 into a digital signal.

The voice processing unit 220 may include a known analog-to-digital converter (ADC). Thus, the voice processing unit 220 may convert the signal of the voice corresponding to the greater semantic unit set including the semantic unit set as a target or improvement (i.e., to be improved) or the signal for the improvement phonetic sound from the analog signal to the digital signal by performing at least one of a sampling process, a quantization process, and an encoding process.

Also, the voice processing unit 220 may amplify the voice signal, cancel noise from the voice signal, selectively receive only a voice signal of a specific frequency band, or change a waveform of the voice signal. To this end, the voice processing unit 220 may include a known amplifier, a known noise filter, a known bandpass/band reject filter, a Kalman filter, an EMA filter, or a Savitzky-Golay filter. The voice processing unit 220 may convert a voice signal of a time domain into a voice signal of a frequency domain or convert a voice signal of a frequency domain into a voice signal of a time domain.

The voice processing unit 220 may transfer the digital phonetic sound signal, an outcome of the processing, to the semantic unit improving unit 230 as described hereinafter.

The semantic unit improving unit 230 according to an exemplary embodiment of the present invention may capture a greater semantic unit set including a specific semantic unit set as a target of improvement, according to the digital phonetic sound signal transferred from the voice processing unit 220. The greater semantic unit set may physically be a corresponding digital phonetic sound itself or may be a result of conversion to the text. For the latter case, the semantic unit improving unit 230 may include a known voice recognition module or may interwork with the known voice recognition module. Hereinafter, the aforementioned semantic unit set will be referred to as a "captured semantic unit set".

The semantic unit improving unit 230 may also specify the improvement phonetic sound according to the digital phonetic sound signal transferred from the voice processing unit 220. Hereinafter, a semantic unit set corresponding to the specified improvement phonetic sound as described above will be referred to as an "improvement semantic unit set". The "improvement semantic unit set" may physically be the corresponding digital phonetic sound itself or a result of conversion into the text.

Also, the captured semantic unit set handled by the semantic unit improving unit 230 may not necessarily originate from a digital phonetic sound signal. That is, for example, a semantic unit set corresponding to text obtained through user's key input or reading of an optical character, irrespective of generation of analog or digital phonetic sound, may also be the captured semantic unit set as mentioned above.

The semantic unit improving unit 230 may compare the captured semantic unit set and the improvement semantic unit set and extract a semantic unit set as an actual target for improvement, having a high correlation with the improvement semantic unit set from the captured semantic unit set. Such extraction may also be called matching between the semantic unit set as a target of improvement and the improvement semantic unit set. The comparison performed for matching may be comparison between digital phonetic sound signals, comparison between text, or comparison between a digital phonetic sound signal and text. The matched semantic unit set as a target for improvement will be referred to as a "matched semantic unit set" for the purposes of description. Only one matched semantic unit set or a plurality of semantic unit sets may exist in one captured semantic unit set.

The semantic unit improving unit 230 may further utilize information based on a user input (i.e., an input other than utterance of a phonetic sound for improvement) for the purpose of matching. For example, when a plurality of semantic unit sets having a relatively high correlation are extracted according to the correlation inspection result, the user may be allowed to passively select at least a portion of the plurality of semantic unit sets, to determine a matched semantic unit set.

Matching according to an exemplary embodiment of the present invention will be described further hereinafter.

Thereafter, the semantic unit improving unit 230 may improve the matched semantic unit set on the basis of the improvement semantic unit set. That is, the matched semantic unit set may be replaced with the improvement semantic unit set. Such replacement may be deleting the matched semantic unit set present in the captured semantic unit set and inserting the improvement semantic unit set in its place. The outcome may be that the captured semantic unit set has improved quality, while maintaining a physical format. Such an outcome may physically be a digital phonetic sound or text.

Improvement of the semantic unit set according to an exemplary embodiment of the present invention will be described further hereinafter.

Thereafter, the captured semantic unit set, the improvement semantic unit set, and the information regarding the matching may be stored in the database 250 according to an exemplary embodiment of the present invention. Even though the database 250 is illustrated to be included in the semantic unit improving device 100, the database 250 may also be configured as a separate element from the semantic unit improving device 100 as necessary. The database 250 according to an exemplary embodiment of the present invention may have a concept including a computer-readable recording medium, and may be a database including data records, or the like, based on a file system in a broad sense, as well as a database in a narrow sense, and even a simple set of logs may be the database 250 according to an exemplary embodiment of the present invention as long as the set of logs may be searched to extract data.

The control unit 260 according to an exemplary embodiment of the present invention may serve to control a flow of data among the voice sensing unit 210, the voice processing unit 220, the semantic unit improving unit 230, and the database 250. That is, the control unit 260 may control a data flow among the elements of the semantic unit improving device 100, thus allowing the voice sensing unit 210, the voice processing unit 220, the semantic unit improving unit 230, and the database 250 to perform an inherent function thereof.

Matching

Figure 3:
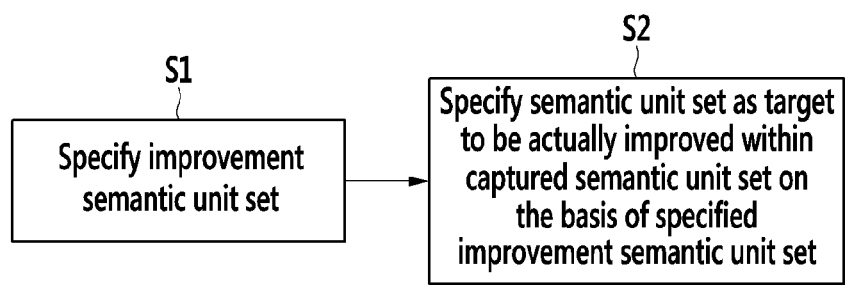
FIG. 3 is a flowchart illustrating a matching method according to an exemplary embodiment of the present invention.

Hereinafter, matching simply mentioned above will be described in detail with reference to FIG. 3. FIG. 3 is a flowchart illustrating a matching method according to an exemplary embodiment of the present invention.

First, the semantic unit improving unit 230 may specify an improvement semantic unit set (S1). That is, the semantic unit improving unit 230 may specify a voice of a digital signal transferred before or after (or immediately before or immediately after) a predetermined instruction of the user, among digital phonetic sound signals transferred from the voice processing unit 220, as a voice to be improved, namely, as an improvement semantic unit set (the foregoing instruction may be a user's utterance of a pre-arranged word or input of a pre-arranged key).

For example, when the user utters a phrase corresponding to a semantic unit set such as "I can correct typing at all without backspace error" and subsequently gives a predetermined instruction, a digital phonetic sound or text corresponding to "error" may be specified as an improvement semantic unit set. Such specifying may be based on a time interval between a voice portion corresponding to "error" and a voice portion in front of "error" (i.e., a voice portion corresponding to "backspace" or a voice portion corresponding to "without backspace") being equal to or greater than a predetermined threshold value.

Also, for example, even when the user utters "error" before or after issuing a predetermined order intending to improve text such as "I can correct typing at all without backspace" displayed on a screen, the semantic unit improving unit 230 may specify an improvement semantic unit set on the basis of a corresponding digital phonetic sound.

Thereafter, the semantic unit improving unit 230 may specify a semantic unit set as an actual target of improvement within the captured semantic unit set, on the basis of the specified improvement semantic unit set (S2).

Before performing the foregoing step, as described above, a greater semantic unit set including the specific semantic unit set as an actual target of improvement may have been captured. Such a captured semantic unit set may be a semantic set such as "I can correct typing at all without backspace" as mentioned above.

The semantic unit improving unit 230 may divide and expand the captured semantic unit set into portions such as "I can", "can correct", "correct typing", "typing at", "at all", "all without", "without backspace" on the basis of a time interval or space between units within the captured semantic unit set and/or a length of the improvement semantic unit set (for example, a time duration of a corresponding digital phonetic sound signal, the number of corresponding syllables (or syntactic words), and the number of corresponding words), and compare the divided portions with the improvement semantic unit set.

In case of comparison between digital phonetic sounds, such comparison may be comparison between characteristics of digital phonetic sounds in a time domain or frequency domain. A feature point in a wave of a digital phonetic sound signal may be typical among voice characteristics. However, in order to compare digital phonetic sounds, various algorithms may be used, and thus features (characteristics) of a digital phonetic sound to be considered may freely include one or more of the following.

(1) Characteristics of Voice Signal in Time Domain

Maximum amplitude, average amplitude, average frequency, average value, standard deviation, standard deviation normalized by overall amplitude, variance, skewness, kurtosis, sum, absolute sum, root mean square (RMS), crest factor, dispersion, entropy, power sum, center of mass, coefficients of variation, cross-correlation, zero-crossings, seasonality, DC bias, or the characteristics described above calculated for derivatives of primary, secondary, tertiary, or higher order of the voice signal (2) Characteristics of Voice Signal in Frequency Domain Spectral centroid, spectral density, spherical harmonics, total average spectral energy, band energy ratio for every octave, log spectral band ratio, linear prediction-based cepstral coefficients (LPCC), perceptual linear prediction (PLP) cepstral coefficient, mel-frequency cepstral coefficient, frequency phase, the characteristics described above calculated for derivatives of primary, secondary, tertiary, or higher order of the voice signal in frequency domain expression The comparison described above may be a comparison between text. In this case, text may be compared in every syntactic word or glosseme. Through such a comparison, one or more known text comparison algorithm may be employed. For example, two texts having a high sequential similarity in every syntactic word (for example, a similarity in a phonetic value or spelling) may be defined as texts having high correlation.

The semantic unit improving unit 230 may determine a portion having a high correlation with the improvement semantic unit set within the captured semantic unit set, as a matched semantic unit set. In the above example, the portion may be a semantic unit set corresponding to the "at all" portion.

Improvement of Semantic Unit Set

Figure 4:
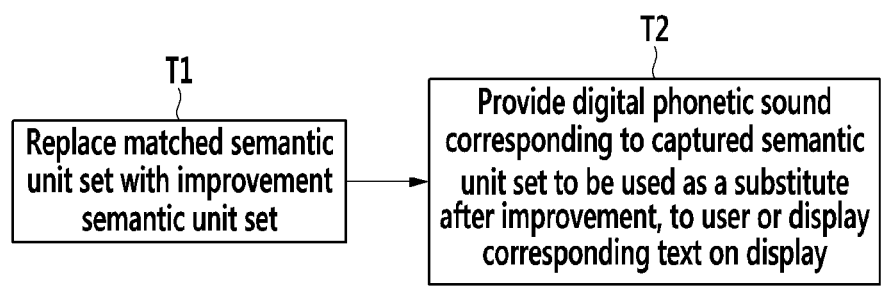
FIG. 4 is a flowchart illustrating an improving method according to an exemplary embodiment of the present invention.

Hereinafter, improvement of a semantic unit set briefly described above will be described in detail with reference to FIG. 4. FIG. 4 is a flowchart illustrating an improving method according to an exemplary embodiment of the present invention.

First, the semantic unit improving unit 230 may replace the matched semantic unit set with the improvement semantic unit set (step T1). Here, as an outcome of the replacement, the captured semantic unit set may include the improvement semantic unit set instead of the matched semantic unit set. Such an outcome of the replacement may be an improved voice recognition result or improved text. According to the foregoing example, the improved voice recognition result or text may be "I can correct typing error without backspace". The improved voice recognition result or text may accurately meet the user's original intention.

The semantic unit improving unit 230 may provide a digital phonetic sound corresponding to the captured semantic unit set to be used as a substitute after improvement to the user or may display corresponding text (step T2). Thus, according to the foregoing example, the digital phonetic sound or text corresponding to the semantic unit set of "I can correct typing error without backspace" may be heard or displayed to the user.

Here, however, the improvement phonetic sound may not guarantee sufficient improvement according to circumstances. That is, quality of the improvement phonetic sound is not sufficiently high from the beginning due to a problem (for example, inaccuracy in pronunciation, the use of dialect, etc.) inherent in a user, and thus the improvement phonetic sound is erroneously recognized as corresponding to another semantic unit set, or even though quality of the improvement phonetic sound is not so low, the improvement phonetic sound is erroneously recognized as corresponding to another semantic unit set during a specific process due to an environment problem (for example, an environment involving noise, a low specification of the semantic unit improving device 100, etc.). In such a case, what is heard or displayed to the user after the attempt of improvement may not be the digital phonetic sound or text corresponding to the semantic unit set of "I can correct typing error without backspace", for example, but mat still be the digital phonetic sound or text corresponding to the semantic unit set of "I can correct typing at all without backspace" or the digital phonetic sound or text corresponding to the semantic unit set of "I can correct typing era without backspace". This result may be considerably disappointing to the user.

Thus, according to an exemplary embodiment of the present invention, the following additional step may be further performed.

Typically, if predetermined additional information is further used together with the improvement phonetic sound after performing step T2, alternatively, after performing step T1 and before performing step T2, or before performing step T1, the semantic unit improving unit 230 may more precisely specify a semantic unit set corresponding to the improvement phonetic sound on the basis of the additional information as well. Hereinafter, various examples of additional information enabling more precise specifying will be described.

1-1. Partial Spelling

For example, the user may further sequentially utter "e", "r", and "r", in addition to "error" corresponding to the improvement phonetic sound in the foregoing example. In this case, the semantic unit improving unit 230 may recognize that "e", "r" and "r" are a partial spelling for specifying the improvement semantic unit set more precisely in fact on the basis of a preset setting (that is, after a predetermined number of letters are continuously uttered, when an improvement phonetic sound corresponding to the improvement semantic unit set having a front portion sequentially identical to the corresponding alphabets is uttered, the foregoing letters are all regarded as a partial spelling of the improvement semantic unit set) or other machine running technique. This may obviously guarantee more precisely specifying the improvement semantic unit set.

1-2. Military Phonetic Alphabet

For example, the user may sequentially utter "echo", "romeo", and "romeo", in addition to "error" corresponding to the improvement phonetic sound in the foregoing example. In this case, the semantic unit improving unit 230 may recognize that "echo", "romeo", and "romeo" are a partial spelling for specifying the improvement semantic unit set more precisely in fact on the basis of a preset setting (that is, after a predetermined number of military phonetic letters are continuously uttered, when an improvement phonetic sound corresponding to the improvement semantic unit set having a front portion sequentially identical to the corresponding alphabets is uttered, the foregoing letters are all regarded as a partial spelling of the improvement semantic unit set) or other machine running technique.

Meanwhile, in the Korean language, the partial spelling technique may be executed by an interpretation utterance (for example, sequential utterance of "여" and "이" for an improvement semantic unit set of "계발") of a diphthong character hard to specify, and in the Japanese language, the partial spelling technique may be executed by utterance regarding a left side radical of a Chinese character (for example, additional utterance of "山編"(やまへん) in order to prevent an improvement semantic unit set of "嶋田"(しまだ) from being erroneously recognized as "島田"(しまだ).

2. Hint Word

For example, the user may further sequentially utter "of" and "erroneous", in addition to "error" corresponding to the improvement phonetic sound in the foregoing example. In this case, the semantic unit improving unit 230 may recognize that "erroneous" is a hint word (that is, a word having a spelling identical or similar to a word of the improvement semantic unit set correct at least in a portion thereof) for specifying the improvement semantic unit set more precisely on the basis of a preset setting (that is, a setting that when "of" is uttered in a portion where the improvement phonetic sound is uttered, a following word corresponding to a phonetic sound is regarded as a hint word) or other machine running technique. This may obviously guarantee more precisely specifying the improvement semantic unit set. Here, "of" considered as a reserved word may be replaced with another word that can be easily understood by the user or that has a low erroneous recognition rate, such as "like", or the like.

Meanwhile, besides the foregoing example, in a case in which the user utters "Zoe" as an improvement phonetic sound but "Zoe" is recognized as "Joe" to make erroneous improvement, the user may utter "Zoe" once again and further utter a hint word for stressing letters to be included in the correct improvement semantic unit set, such as "Z", "of", and "Zebra", together with the reserved word and the corresponding letters. Accordingly, the semantic unit improving unit 230 may correct the improvement semantic unit set to include the letters of the hint word, that is, "Zoe".

As for the Korean language, in a case in which "안쪽의" is erroneously recognized as "'안쪽에", when the user utters "안쪽의" once again and further utters ""의자의 의", the semantic unit improving unit 230 may correct the improvement semantic unit set to include "의" of the hint word "의자", that is, to "안쪽의".

In the case of the Japanese language, in order to correct that "感じ"(かんじ) is erroneously recognized as "漢字"(かんじ), "感動の感"(かんどうのかん) may be additionally uttered, or in order to correct that "買いに"(かいに) is erroneously recognized as "海に"(かいに), "買い物の買い"(かいもののかい) may be additionally uttered.

Meanwhile, regardless of language, a word similar in meaning to a correct improvement semantic unit set may be additionally uttered (for example, in order to include "error" in an improvement semantic unit set, a synonym "mistake" may be additionally uttered together with a reserved word "like"), a word in a superordinate-subordinate relationship may be uttered (for example, in order to include "Kia" in an improvement semantic unit set, a relatum "car company" may be additionally uttered together with a reserved word "like"), or an associative word may be additionally uttered (for example, in order to make "개집" become an improvement semantic unit set, an associative word "멍멍" may be additionally uttered together with a reserved word "like", or in order to make "queries" become an improvement semantic unit set, an associative word "database" may be additionally uttered together with a reserved word "for").

That is, when the user further utters a hint word (or a hint character) together with a reserved word in the vicinity of an improvement phonetic sound, the semantic unit improving unit 230 may interpret the hint word and more precisely specify an improvement semantic unit set corresponding to the improvement phonetic sound.

The embodiments of the present invention can be implemented in a form of an executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable recording media include magnetic media such as a hard disk, a floppy disk, magnetic tape, an optical media such as a CD-ROM and a DVD, a magneto-optical media such as a floptical disk and hardware devices such as ROM, RAM, and flash memory specially designed to store and carry out programs. Program commands include not only a machine language code made by a complier, but also a high level code that can be used by an interpreter etc., which is executed by a computer. The aforementioned hardware device can work as more than a software module to perform the action of the present invention, and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A computer-implemented method for correcting errors in a captured semantic unit set including at least one semantic unit set, the method comprising:
displaying the captured semantic unit set including an incorrect semantic unit set on a display screen;
receiving, from an utterance of a user through a voice sensing unit, an analog voice signal including an improvement semantic unit set to correct the incorrect semantic unit set in the captured semantic unit set and a predetermined number of letters forming a partial spelling of the improvement semantic unit set immediately following the utterance of the improvement semantic unit set without an intervening phonetic sound uttered between the utterance of the improvement semantic unit set and the utterance of the predetermined number of letters;
converting the analog voice signal of the improvement semantic unit set to a digital signal by performing at least one of a sampling process, a quantization process, and an encoding process;
specifying, by a processor, the incorrect semantic unit set within the captured semantic unit set on a basis of correlation thereof with the improvement semantic unit set; and
replacing, by the processor, the incorrect semantic unit set within the captured semantic unit set with the improvement semantic unit set.

2. The method of claim 1, wherein the specified improvement semantic unit set is determined to be correct when the predetermined number of letters sequentially coincide with a portion of the specified improvement semantic unit set.

3. The method of claim 1, wherein the predetermined number of letters are military phonetic alphabets which sequentially coincide with a portion of the specified improvement semantic unit set.

4. A non-transitory computer-readable recording medium storing a computer program for enabling a computer to execute the method according to claim 1.

5. An apparatus for correcting errors in a captured semantic unit set including at least one semantic unit set, the apparatus comprising:
a voice sensing unit configured to receive an analog voice signal of an improvement semantic unit set according to utterance of a user to correct an incorrect semantic unit set in the captured semantic unit set displayed on a display screen;
a voice processing unit configured to convert the analog voice signal of the improvement semantic unit set to a digital signal by performing at least one of a sampling process, a quantization process, and an encoding process; and
a semantic unit improving unit, including at least one processor, configured to
receive, through the voice sensing unit from the user, the analog voice signal of the improvement semantic unit set to correct the incorrect semantic unit set in the captured semantic unit set and a predetermined number of letters forming a partial spelling of the improvement semantic unit set immediately following the utterance of the improvement semantic unit set without an intervening phonetic sound uttered between the utterance of the improvement semantic unit set and the utterance of the predetermined number of letters,
specify the incorrect semantic unit set within the captured semantic unit set on a basis of a correlation thereof with the improvement semantic unit set, and to
replace the incorrect semantic unit set within the captured semantic unit set with the improvement semantic unit set.

6. A computer-implemented method for correcting errors in a captured semantic unit set including at least one semantic unit set, the method comprising:
displaying the captured semantic unit set including an incorrect semantic unit set on a display screen;
receiving, from an utterance of a user through a voice sensing unit, an analog voice signal including an improvement semantic unit set to correct the incorrect semantic unit set in the captured semantic unit set and a predetermined reserve word and a hint word immediately following the utterance of the improvement semantic unit set without an intervening phonetic sound uttered between the utterance of the improvement semantic unit set and the utterance of the predetermined number of letters,
wherein the hint word corresponds to at least one of a word having a spelling at least partially identical or similar to that of a word in the specified improvement semantic unit set, a word having a synonymic relationship with a word in the specified improvement semantic unit set, a word having a superordinate-subordinate relationship with a word in the specified improvement semantic unit set, and a word having an associate relationship with a word in the specified improvement semantic unit set;
converting the analog voice signal of the improvement semantic unit set to a digital signal by performing at least one of a sampling process, a quantization process, and an encoding process;
specifying, by a processor, the incorrect semantic unit set within the captured semantic unit set on the basis of correlation thereof with the improvement semantic unit set; and
replacing, by the processor, the incorrect semantic unit set within the captured semantic unit set with the improvement semantic unit set.

* * * * *